R. H. OWENS.
INTERNAL COMBUSTION ENGINE.
APPLICATION FILED JAN. 29, 1915.
1,150,700.
Patented Aug. 17, 1915.
3 SHEETS—SHEET 1.
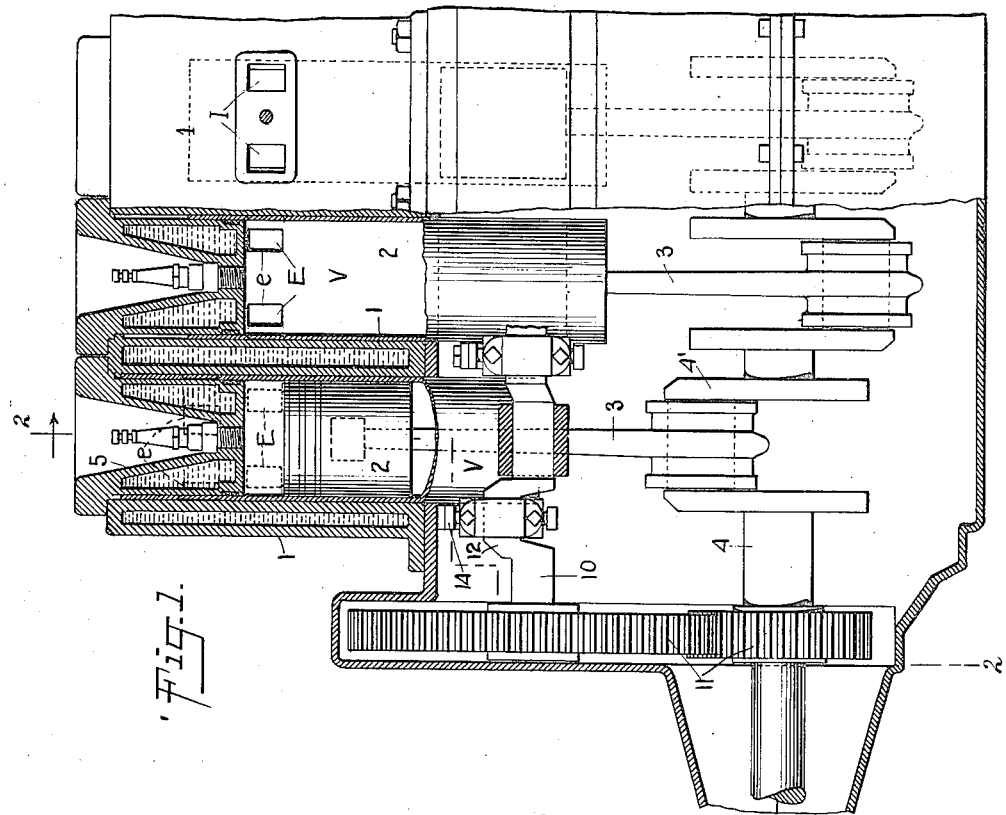
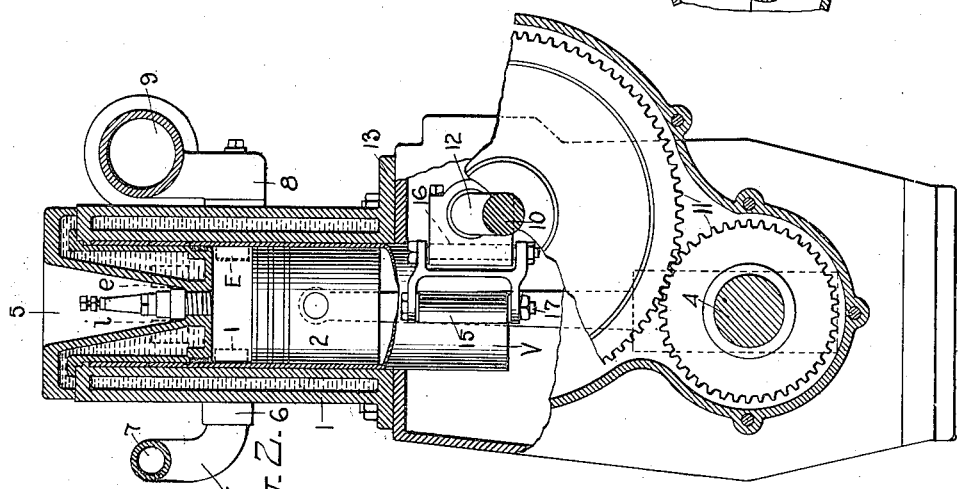
WITNESSES:
William P. Goebel.
C. Bradway
INVENTOR
Ralph H. Owens
BY Munn&Co
ATTORNEYS R. H. OWENS.
INTERNAL COMBUSTION ENGINE.
APPLICATION FILED JAN. 29, 1915.
1,150,700.
Patented Aug. 17, 1915.
3 SHEETS—SHEET 2.
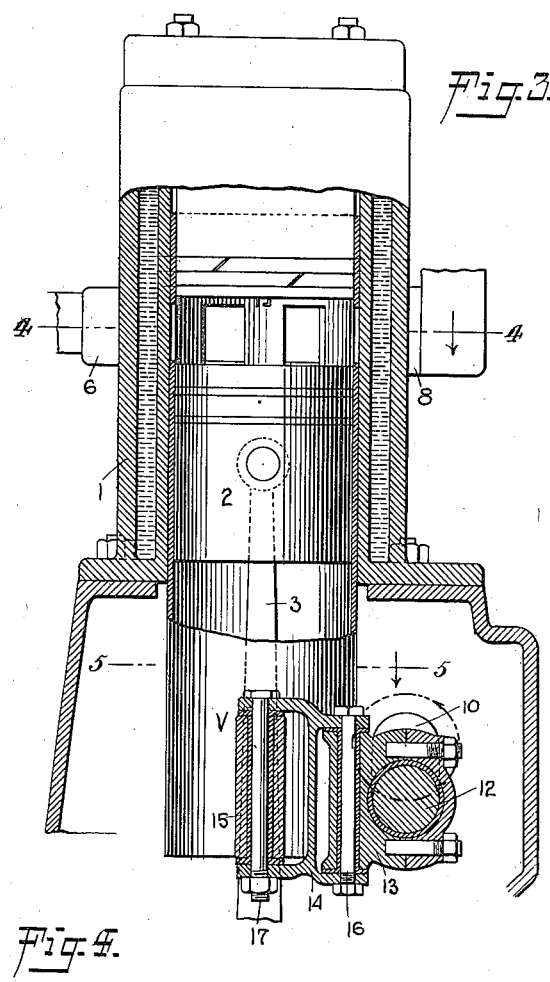
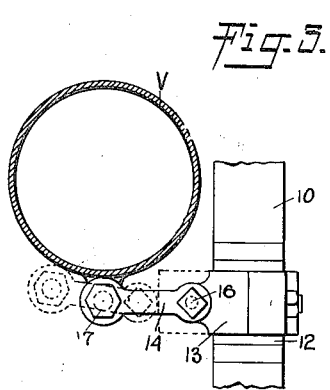
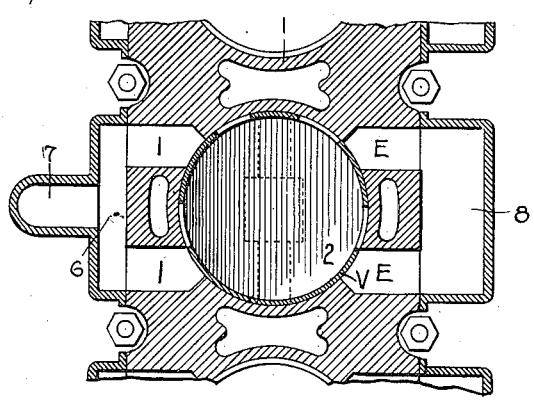
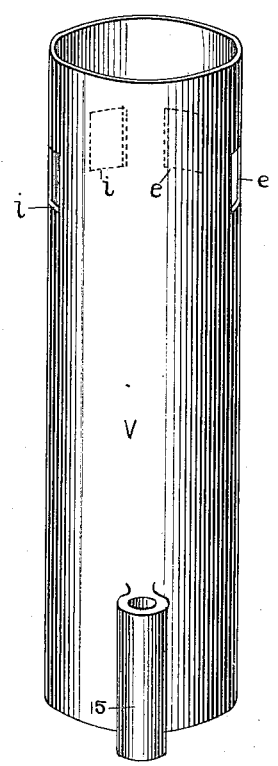
WITNESSES:
William P. Goebel.
A. Bradway
INVENTOR
Ralph H. Owens
BY Munn & Co.
ATTORNEYS R. H. OWENS.
INTERNAL COMBUSTION ENGINE.
APPLICATION FILED JAN. 29, 1915.
1,150,700.
Patented Aug. 17, 1915.
3 SHEETS—SHEET 3.
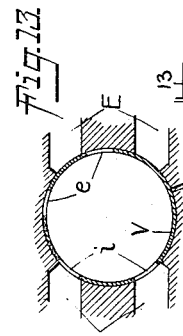
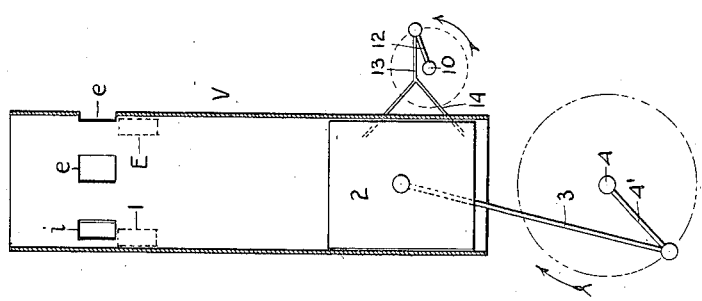
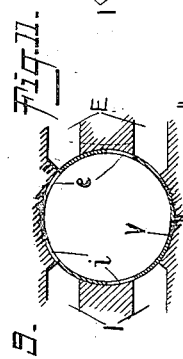
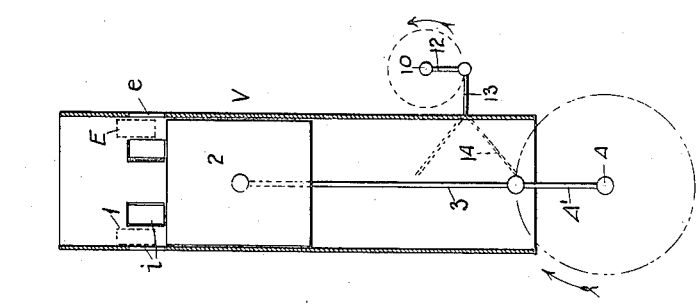
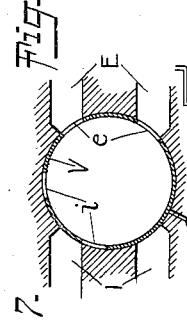
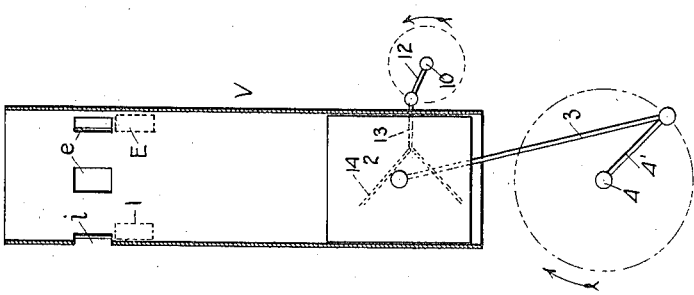
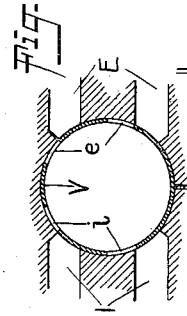
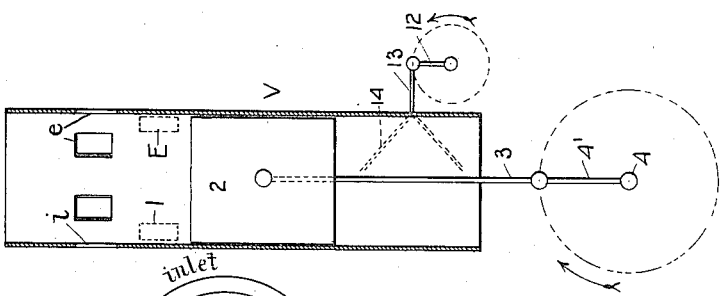
WITNESSES:
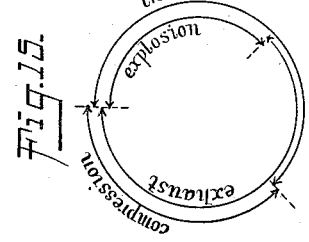
INVENTOR
Ralph H. Owens
BY
ATTORNEYS

UNITED STATES PATENT OFFICE.

RALPH H. OWENS, OF COZAD, NEBRASKA.

INTERNAL-COMBUSTION ENGINE.

1,150,700.  Specification of Letters Patent.  Patented Aug. 17, 1915.

Application filed January 29, 1915. Serial No. 5,042.

*To all whom it may concern:*

Be it known that I, RALPH H. OWENS, a citizen of the United States, and a resident of Cozad, in the county of Dawson and State of Nebraska, have invented a new and Improved Internal-Combustion Engine, of which the following is a full, clear, and exact description.

This invention relates to internal combustion engines and has to deal more particularly with valve mechanisms of that type in which a tubular valve within the cylinder reciprocates to control the admission of explosive mixture to the cylinder and the exhaust of the spent gases therefrom.

The invention has for its general objects to improve and simplify the construction and operation of valve mechanisms of the character referred to so as to be reliable and efficient in use, comparatively simple and inexpensive to manufacture, and so designed that the mixture is admitted with a minimum of wire-drawing effect and the exhaust gases freely discharge because of the large areas of the inlet and exhaust ports and the long periods of opening thereof.

A further object of the invention is the provision of a tubular inlet and exhaust valve driven by a novel, simple and effective mechanism from the secondary or half speed shaft in such a manner that the valve will have a rocking reciprocatory motion to open and close the inlet and exhaust ports in proper sequence.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a partial side view of a multiple cylinder engine with two of the cylinders in section to illustrate the valve mechanism; Fig. 2 is a vertical section on the line 2—2, Fig. 1; Fig. 3 is an enlarged sectional view of one cylinder and the link connection between the valve thereof and the secondary crank shaft; Fig. 4 is a horizontal section on the line 4—4, Fig. 3; Fig. 5 is a plan view of the operating connection between the secondary crank shaft and a valve; Fig. 6 is a perspective view of a valve detached; Fig. 7 is a view of a valve with its ports in closed position, as when the piston begins its power stroke; Fig. 8 is a diagrammatic view showing the relative position of the valve and piston in correspondence to Fig. 7; Fig. 9 is a view of the valve with the exhaust ports open; Fig. 10 is a diagrammatic view showing the relative position of the valve and piston just prior to the opening of the exhaust ports; Fig. 11 is a view showing the valve with its ports closed, as at the beginning of the suction stroke; Fig. 12 is a diagrammatic view showing the relative position of the valve and piston in correspondence with Fig. 11; Fig. 13 is a view of a valve with its inlet ports open; Fig. 14 is a diagrammatic view showing the relative position of the valve and piston at the beginning of the compression stroke; and Fig. 15 is a graphic view showing the times and durations of the valve opening and closing periods in a two revolution cycle of operation.

In the present instance the invention is shown in connection with a multiple cylinder engine, but it is to be understood that it is applicable to a single cylinder engine.

Referring to the drawing, each cylinder 1 has therein a piston 2 connected by a rod 3 with the main crank shaft 4, the head 5 of the cylinder being of the reëntrant form, and this, together with the cylinders, is water-jacketed. As shown in Fig. 4, each cylinder has a pair of inlet ports I and a pair of exhaust ports E. The pairs of ports I and E are disposed at opposite sides of the cylinder and the ports of each pair are spaced apart from each other. By arranging the ports in pairs the valve can open and close the ports with a smaller range of movement than would be required for a single opening of the same area as a pair of ports. The inlet ports communicate with the chamber 6 connected with a manifold 7, and the exhaust ports E discharge into an exhaust chamber 8 which connects with an exhaust manifold 9.

In each cylinder is a cylindrical or tubular valve V which has a snug working fit in the cylinder so that it can reciprocate for opening and closing the ports in the cylinder. The piston 2 reciprocates within the valve V and has the regular four-cycle series of movements, and the valve has an independent movement through connecting means between it and the secondary shaft 10, which is driven at half speed from the crank shaft 4 through gearing 11. The valve has pairs of inlet openings $i$ and exhaust ports $e$ which are arranged in a common plane and so spaced apart that the inlet ports of the valve will register simultaneously with both the cylinder inlet ports I while the exhaust ports are closed, and the exhaust ports $e$ of the valve will register with the cylinder exhaust ports E when the inlet ports are closed, and yet in a third or intermediate position all of the valve ports will be closed.

The valve is adapted to have a longitudinal reciprocatory and a rotary reciprocatory movement, which movements are simultaneous so that the resultant movement will prevent the wearing of grooves. This movement is brought about by means of a crank 12 on the secondary shaft 10, which has a crank pin box 13 connected by a link 14 with a tubular lug 15 on the outside of the valve V at the end opposite from the ports. The link is connected by pivot pins or bolts 16 and 17 with the crank pin box 13 and valve V. These pivot pins 16 and 17 are parallel with each other and also with the axis of the valve and transverse to the axis of the crank 12.

In referring to Fig. 3 it will be assumed that the crank 12 is revolving in an anti-clockwise direction, and from the position shown it causes the valve V to move upwardly and simultaneously turn to the right through the first quarter of a revolution, and then upwardly and simultaneously to the left during the second quarter of a revolution, and during the third quarter the valve V moves downwardly and to the left, while during the fourth quarter the valve moves downwardly and turns to the right. By this cycle of movement the inlet and exhaust ports are opened and closed in the proper sequence for four-cycle operation. It will be observed that the link 14 will have a swinging movement about the pin 16 as a center.

For a more definite understanding of the cycle of operation reference is to be had to Figs. 7 to 15 inclusive. In Fig. 7 the valve V is shown with its ports closed, which is the position it occupies during the power stroke. The valve ports are considerably above the cylinder ports, as shown in Fig. 8, and as the piston 2 moves on its working stroke there is a simultaneous movement of the valve downwardly and to the left, so that by the time the main crank 4' moves through approximately one hundred and thirty-five degrees, the exhaust ports $e$ of the valve will meet the cylinder ports E and begin to register therewith, and the exhaust gases will begin to escape and continue escaping while the crank 4' moves through two hundred and twenty-five degrees when the piston 2 will be at the end of its exhaust stroke. At the end of the exhaust stroke the valve is in the position shown in Fig. 11, having returned thereto from the position shown in Fig. 9, during the last part of the exhaust stroke, and now the valve begins to move in an anti-clockwise direction from the position shown in Fig. 11 to that shown in Fig. 13, thus opening the inlet ports $i$, and during this movement of the valve the piston travels outwardly from the position shown in Fig. 12 to its outer dead center, and partly inward on its next stroke, the crank 4' of the engine traveling through approximately two hundred and twenty five degrees. The piston now completes its inward movement and compresses the charge which is retained in the cylinder by the valve returning from the position shown in Fig. 13 to that shown in Fig. 7, where the inlet and exhaust ports are closed. The compressed charge is now fired so as to force out the piston from the position shown in Fig. 8.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as are within the scope of the appended claims.

Having thus described my invention, I claim as new and desire to secure by Letters Patent:

1. An internal combustion engine comprising a cylinder having inlet and exhaust ports, a tubular valve in the cylinder having inlet and exhaust ports, a piston reciprocating in the valve, a crank shaft connected with the piston, a secondary shaft driven by the crank shaft, and an operating connection between the secondary shaft and valve, said means including linked members pivotally connected together and with the valve, the axes of the pivotal connections being parallel with the axis of the valve, whereby the rotation of the secondary shaft imparts a rocking and reciprocatory movement to the valve.

2. An internal combustion engine comprising a cylinder having pairs of inlet and exhaust ports, a tubular valve therein having pairs of inlet and exhaust ports, a piston reciprocating in the valve, a crank shaft connected with the piston, a secondary shaft geared to the crank shaft, a member connected with the secondary shaft and revolving therewith, a link a pivot connecting the link with the said member and disposed parallel with the axis of the valve and on which the link swings as a fixed axis, and a pivot connecting the link with the valve, whereby the valve receives a rocking and longitudinally reciprocatory movement from the secondary shaft.

In testimony whereof I have signed my name to this specification in the presence of two subscribing witnesses.

RALPH H. OWENS.

Witnesses:
H. W. FLINT,
RAY G. HUGHES.